US009185691B2

(12) United States Patent
Noh et al.

(10) Patent No.: US 9,185,691 B2
(45) Date of Patent: Nov. 10, 2015

(54) METHOD FOR TRANSMITTING AND RECEIVING CONTROL CHANNEL IN WIRELESS COMMUNICATION SYSTEM

(71) Applicant: Electronics and Telecommunications Research Institute, Daejeon (KR)

(72) Inventors: Tae Gyun Noh, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/630,956

(22) Filed: Sep. 28, 2012

(65) Prior Publication Data

US 2013/0107819 A1 May 2, 2013

Related U.S. Application Data

(63) Continuation of application No. PCT/KR2011/002927, filed on Apr. 22, 2011.

(30) Foreign Application Priority Data

Apr. 30, 2010 (KR) ........................ 10-2010-0040982
Aug. 17, 2010 (KR) ........................ 10-2010-0079151
Aug. 25, 2010 (KR) ........................ 10-2010-0082677
Oct. 14, 2010 (KR) ........................ 10-2010-0100197
Oct. 14, 2010 (KR) ........................ 10-2010-0100476
Nov. 5, 2010 (KR) ........................ 10-2010-0109817

(51) Int. Cl.
*H04W 72/04* (2009.01)
*H04L 5/00* (2006.01)

(52) U.S. Cl.
CPC ........... *H04W 72/042* (2013.01); *H04L 5/0094* (2013.01); *H04L 5/0007* (2013.01); *H04L 5/0048* (2013.01); *H04L 5/0053* (2013.01)

(58) Field of Classification Search
CPC ............... H04L 5/0053; H04W 72/04; H04W 72/0406; H04W 72/042; H04W 72/044; H04W 72/1263
USPC ......... 370/230, 235, 236, 276, 277, 278, 282, 370/310, 328, 329, 431, 437, 464, 468
See application file for complete search history.

(56) References Cited

U.S. PATENT DOCUMENTS

2008/0031191 A1* 2/2008 Kashima et al. .............. 370/329
2008/0049690 A1* 2/2008 Kuchibhotla et al. ......... 370/338
(Continued)

FOREIGN PATENT DOCUMENTS

KR 10-2008-0099063 11/2008
KR 10-2009-0078715 7/2009
(Continued)

OTHER PUBLICATIONS

International Search Report for Application No. PCT/KR2011/002927, 3 pages, dated Dec. 26, 2011.
(Continued)

*Primary Examiner* — Curtis A Alia
(74) *Attorney, Agent, or Firm* — Nelson Mullins Riley & Scarborough LLP; Anthony A. Laurentano, Esq.; Lewis Lee, Esq.

(57) ABSTRACT

Provided is a communication system that transmits a control channel using a downlink. The communication system may transmit, to the terminal, transmission information of uplink allocation information that indicates whether uplink allocation information is transmitted using a downlink, and the terminal may determine whether the uplink allocation information is included in a downlink frame, based on the transmission information of uplink allocation information. The base station may transmit, to the terminal, information associated with a resource which has a possibility of being used for transmission of a physical downlink control channel (PDCCH), and the terminal may decode the PDCCH in the resource which has a possibility of being used for transmission of the PDCCH.

5 Claims, 15 Drawing Sheets

(56) References Cited

U.S. PATENT DOCUMENTS

2008/0080422 A1* 4/2008 Frederiksen et al. ......... 370/329
2008/0080423 A1* 4/2008 Kolding et al. ............... 370/329
2009/0196204 A1* 8/2009 Astely et al. .................. 370/280
2009/0249153 A1 10/2009 Zhang
2010/0004001 A1 1/2010 Tao et al.
2010/0040001 A1* 2/2010 Montojo et al. .............. 370/329
2010/0067457 A1 3/2010 Wang et al.
2010/0091680 A1 4/2010 Chun et al.
2010/0128692 A1* 5/2010 Aiba et al. .................... 370/329
2010/0290418 A1* 11/2010 Nishio et al. .................. 370/329
2011/0085513 A1* 4/2011 Chen et al. .................... 370/330

FOREIGN PATENT DOCUMENTS

KR 10-2009-0098651 9/2009
KR 10-2010-0014091 2/2010
KR 1020100039203 4/2010
WO 2008/038088 A2 4/2008
WO 2009/057286 A1 5/2009
WO 2009/091142 A2 7/2009
WO 2009/128604 A1 10/2009
WO 2009/129343 A1 10/2009
WO 2010011104 A2 1/2010
WO 2010/016737 A2 2/2010
WO 2010/016737 A3 2/2010
WO 2010/039003 A2 4/2010
WO 2011/136505 A2 11/2011

OTHER PUBLICATIONS

3GPP TS 36.212 V9.1.0 (Mar. 2010), “3rd Generation Partnership Project; Technical Specification Group Radio Access Network; Evolved Universal Terrestrial Radio Access (E-UTRA); Multiplexing and channel coding (Release 9),” 61 pages (2003).

3GPP TS 36.212 V9.1.0 (Mar. 2010), “3rd Generation Partnership Project; Technical Specification Group Radio Access Network; Evolved Universal Terrestrial Radio Access (E-UTRA); Multiplexing and channel coding (Release 9),” 16 pages (2010).

3GPP TS 36.213 V9.1.0 (Mar. 2010), “3rd Generation Partnership Project; Technical Specification Group Radio Access Network; Evolved Universal Terrestrial Radio Access (E-UTRA); Physical layer procedures (Release 9),” 13 pages (2010).

* cited by examiner

| | |
|---|---|
| 0 | PDCCH CANDIDATE WHEN AGGREGATION LEVEL IS 8 |
| 0 | PDCCH CANDIDATE WHEN AGGREGATION LEVEL IS 4 |
| 0 | PDCCH CANDIDATE WHEN AGGREGATION LEVEL IS 2 |
| 0 | PDCCH CANDIDATE WHEN AGGREGATION LEVEL IS 1 |

| | |
|---|---|
| 0 | PDCCH CANDIDATE WHEN AGGREGATION LEVEL IS 8 |
| 0 | PDCCH CANDIDATE WHEN AGGREGATION LEVEL IS 4 |
| 0 | PDCCH CANDIDATE WHEN AGGREGATION LEVEL IS 2 |
| 0 | PDCCH CANDIDATE WHEN AGGREGATION LEVEL IS 1 |

METHOD FOR TRANSMITTING AND RECEIVING CONTROL CHANNEL IN WIRELESS COMMUNICATION SYSTEM

RELATED APPLICATIONS

This application is a continuation of PCT/KR2011002927, filed on Apr. 22, 2011, which claims the benefit of Korean Patent Application No. 10-2010-0040982, filed on Apr. 30, 2010, Korean Patent Application No. 10-2010-0079151, filed on Aug. 17, 2010, Korean Patent Application No. 10-2010-0082677, filed on Aug. 25, 2010, Korean Patent Application No. 10-2010-0100197, filed on Oct. 14, 2010, Korean Patent Application No. 10-2010-0100476, filed on Oct. 14, 2010, Korean Patent Application No. 10-2010-0109817, filed on Nov. 5, 2010, in the Korean Intellectual Property Office, the disclosure of which is incorporated herein by reference.

TECHNICAL FIELD

The present invention relates to a method of transmitting and receiving a control channel in a wireless communication system, and more particularly, to a method of transmitting downlink allocation information and uplink allocation information using a downlink sub-frame.

BACKGROUND ART

An amount of signal transmitted via a wireless communication network is constantly increasing. In the near future, a signal of which a volume is several times greater than currently used signals will be transmitted via the wireless communication network.

Recently, a technology that improves efficiency in data transmission using a relay has been introduced. The relay receives data from a base station using the downlink sub-frame, and transmits the received data to a terminal using another downlink sub-frame.

Accordingly, the base station may transmit a control channel with respect to the relay, as well as a control channel with respect to the terminal, using a downlink sub-frame. Since a number of control channels to be transmitted via a downlink is increased, there is a desire for a method of efficiently transmitting the control channels.

DISCLOSURE OF INVENTION

Technical Goals

An aspect of the present invention provides a method of effectively transmitting and receiving a control channel in a wireless communication system.

Technical Solutions

According to an aspect of an exemplary embodiment, there is provided a method for operation of a base station, the method including allocating downlink allocation information to a downlink sub-frame, determining whether to transmit uplink allocation information using the downlink sub-frame, inserting, to the downlink allocation information based on the determination, transmission information of uplink allocation information that includes information associated with whether to transmit the uplink allocation information, and transmitting the downlink sub-frame to a terminal.

According to another aspect of an exemplary embodiment, there is provided a method for operation of a terminal, the method including receiving a downlink sub-frame from a base station, extracting transmission information of uplink allocation information from downlink allocation information included in the downlink sub-frame, and determining whether uplink allocation information is included in the downlink sub-frame, based on the transmission information of uplink allocation information.

According to still another aspect of an exemplary embodiment, there is provided a method for operation of a base station, the method including generating a resource allocation indicator that includes information associated with a radio resource which has a possibility of being used for transmission of a physical downlink control channel (PDCCH), based on a resource allocation scheme identifier that indicates information associated with a resource allocation type, and transmitting, to a terminal, the resource allocation indicator and the resource allocation scheme identifier, and the PDCCH is received based on the resource allocation scheme identifier and the resource allocation indicator.

According to yet another aspect of an exemplary embodiment, there is provided a method for operation of a terminal, the method including receiving a resource allocation indicator and a resource allocation scheme identifier from a base station, the resource allocation indicator being generated based on the resource allocation scheme identifier indicating information associated with a resource allocation type, determining a radio resource which has a possibility of being used for transmission of a downlink control channel transmitted from the base station, based on the resource allocation indicator, and decoding the downlink control channel in the radio resource.

Effect

According to example embodiments, there is provided a method of effectively transmitting and receiving a control channel in a wireless communication system.

BEST MODE FOR CARRYING OUT THE INVENTION

Figure 1:
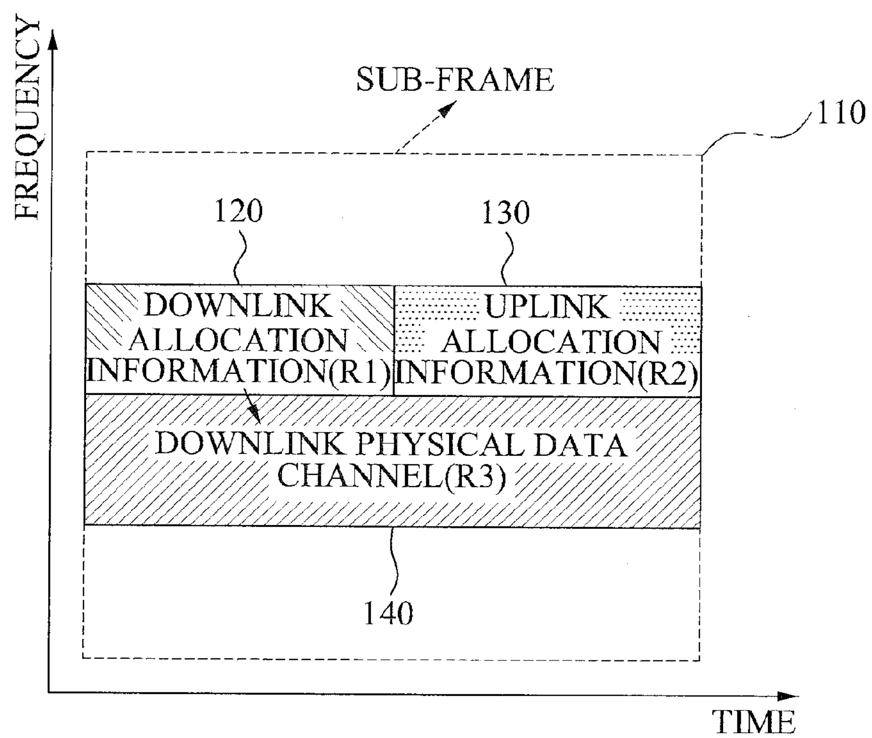
FIG. 1 illustrates an example of transmitting downlink allocation information and uplink allocation information using a downlink sub-frame.

Although a few exemplary embodiments of the present invention have been shown and described, the present invention is not limited to the described exemplary embodiments, wherein like reference numerals refer to the like elements throughout.

Figure 2:
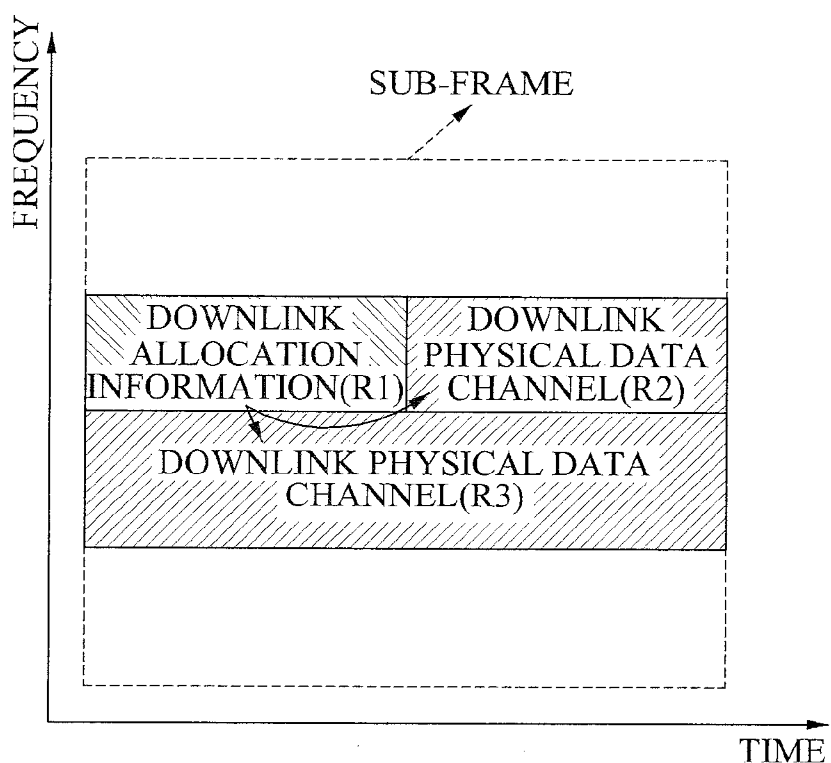
FIG. 2 illustrates another example of transmitting downlink allocation information using a downlink sub-frame.

FIG. 1 illustrates an example of transmitting downlink allocation information and uplink allocation information using a downlink sub-frame, and FIG. 2 illustrates another example of transmitting downlink allocation information using a downlink sub-frame.

The following embodiments of the present invention will be described with reference to FIGS. 1 and 2. It is assumed that a base station transmits the downlink allocation information and the uplink allocation information using a predetermined sub-frame 110 as illustrated in FIG. 1, and the downlink allocation information and the uplink allocation information are located in a resource R1 120 and a resource R2 130, respectively. A downlink physical data channel indicated by the downlink allocation information may be located in a resource R3 140.

Referring to FIG. 2, in a predetermined sub-frame, the base station may transmit only downlink allocation information using a resource R1, and may not transmit the uplink allocation information using a resource R2. In this example, to utilize the resource R2, the base station may also transmit downlink physical data channel using the resource R2. In this example, the downlink physical data channel may be allocated to the resource R2 and a resource R3.

In addition to the downlink allocation information, the uplink allocation information, and the downlink physical data channel, another signal or another channel may be transmitted using the sub-frame 110. Also, downlink allocation information, uplink allocation information, and downlink physical data channels for different terminals may be transmitted using the sub-frame 110.

A bandwidth of the resource R1 120 that is used for transmission of the downlink allocation information and a bandwidth of the resource R2 130 that is used for transmission of the uplink allocation information may be different. The resource R1 120 that is used for the transmission of the downlink allocation information may be divided into a plurality of smaller resources that are not close to each other in a frequency domain and in a time domain. A starting point of a time domain of the resource R1 120 that is used for the transmission of the downlink allocation information may be different from a starting point of the sub-frame 110, and an end point of the time domain may be any point in time of the sub-frame 110. The resource R2 130 that is used for the transmission of the uplink allocation information may be divided into a plurality of smaller resources that are not close to each other in the frequency domain and in the time domain. A starting point of a time domain of the resource R2 130 that is used for the transmission of the uplink allocation information may be any point in time of the sub-frame 110, and an end point of the time domain may be different from an end point of the sub-frame 110.

The resource R3 140 that is used for the transmission of the downlink physical data channel may be divided into a plurality of smaller resources that are not close to each other in the frequency domain and the time domain. A starting point and an end point of a time domain of the resource R3 140 that is used for the transmission of the downlink physical data channel may be different from the starting point and the end point of the sub-frame, and may be different from the starting points and the end points of the resource R3 140 or the resource R2 130 that are used for the transmission of the downlink allocation information and the uplink allocation information.

Referring to FIGS. 1 and 2, the base station may or may not transmit the downlink physical data channel to the resource R2 130. The terminal may determine whether the downlink allocation information or the uplink allocation information is transmitted based on whether decoding of the downlink allocation information or the uplink allocation information succeeds. When the terminal fails in decoding the downlink allocation information or the uplink allocation information even though the base station transmits the downlink allocation information or the uplink allocation information, the terminal may determine that the downlink allocation information or the uplink allocation information is not transmitted.

In an aspect of the present invention, the downlink allocation information that uses the resource R1 120 and the uplink allocation information that uses the resource R2 130 may be associated with the same terminal. Also, the downlink allocation information that uses the resource R1 120 and the uplink allocation information that uses the resource R2 130 may be associated with different terminals.

A case where the downlink allocation information that uses the resource R1 120 and the uplink allocation information that uses the resource R2 130 are associated with the same terminal will be described.

Figure 3:
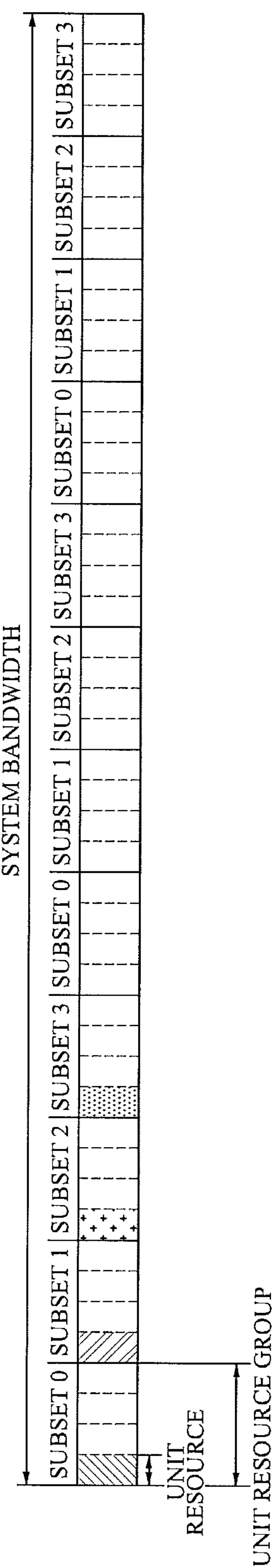
FIG. 3 illustrates an example where a base station transmits a physical downlink control channel (PDCCH) using a single unit resource.

In an aspect of the present invention, the base station may transmit the downlink allocation information and the uplink allocation information to the terminal as illustrated in FIG. 1. The terminal may only succeed in decoding the downlink allocation information and may fail in decoding the uplink allocation information. In this example, the terminal may determine that the uplink allocation information is not transmitted using the resource R2 and the downlink physical data channel is transmitted using the resource R2 as illustrated in FIG. 3. In this example, the terminal may decode the downlink physical data channel using the resource R2 130 and the resource R3 140, and, in most cases, may fail in the decoding.

In another aspect of the present invention, the base station may transmit only the downlink allocation information to the terminal, and may transmit downlink physical data channel using the resource R2, as illustrated in FIG. 2. The terminal may successfully decode the downlink allocation information, and may succeed in decoding the uplink allocation information. In this example, the terminal may determine that the uplink allocation information is transmitted using the resource R2 130 and decode downlink physical data channel only using the resource R3 140, and, in most cases, may fail in the decoding.

A case where the downlink allocation information that uses the resource R1 120 and the uplink allocation information that uses the resource R2 130 are associated with different terminals will be described.

In an aspect of the present invention, the base station may transmit the downlink allocation information to a first terminal using the resource R1 120, and may transmit the uplink allocation information to a second terminal using the resource R2 130. The first terminal may succeed in decoding the downlink location information. However, the first terminal may not decode the uplink allocation information transmitted to the second terminal. Even though the first terminal fails in decoding the uplink allocation information, the first terminal may not be able to determine that the uplink allocation information is not transmitted using the resource R2 130, and that the downlink physical data channel is transmitted using the resource R2 130, since the uplink allocation information may be transmitted using the resource R2 130, as described in the forgoing.

The terminal needs to succeed in decoding the downlink allocation information and needs to be aware of whether the uplink allocation information is transmitted, to determine a location of a resource that is used for transmission of the downlink physical data channel.

In an aspect of the present invention, the base station may transmit the downlink allocation information that includes information indicating whether the uplink allocation information is transmitted or information indicating whether the downlink physical data channel includes a resource which has a possibility of being used for transmission of the uplink allocation information. For ease of descriptions, the information indicating whether the uplink allocation information is transmitted or information indicating whether the downlink physical data channel includes the resource which has a possibility of being used for transmission of the uplink allocation information may be referred to as transmission information of uplink allocation information.

The transmission information of uplink allocation information may distinguish two or three different cases. When the transmission information of uplink allocation information distinguishes two different cases, the two different cases are as follows. In a first case, the uplink allocation information is not transmitted using the resource R2 130, and the resource R2 130 is included in the downlink physical data channel. In a second case, the uplink allocation information is transmitted using the resource R2 130, and the resource R2 130 is excluded from the downlink physical data channel. In this example, the terminal may determine an aggregation level of the uplink allocation information by performing blind-decoding.

When the transmission information of uplink allocation information distinguishes three different cases, the three cases are as follows. In a first case, the uplink allocation information is not transmitted using the resource R2 130 and the resource R2 130 is included in the downlink physical data channel. In a second case, the uplink allocation information allocated to the resource R2 130 with respect to the same terminal indicated by the downlink allocation information, and the resource R2 130 is excluded from the downlink physical data channel. In this example, the terminal may determine an aggregation level of the uplink allocation information by performing blind-decoding. In a third case, the uplink allocation information allocated to the resource R2 130 with respect to the different terminal indicated by the downlink allocation information, and the resource R2 130 is excluded from the downlink physical data channel.

When the transmission information of uplink allocation information distinguishes a plurality of cases, the plurality of cases is as follows. In a first case, the uplink allocation information is not transmitted using resource R2 130, and the resource R2 130 is included in the downlink physical data channel. In remaining cases, the uplink allocation information is allocated to the R2 130 with respect to the same terminal indicated by the downlink allocation information, and the resource R2 130 is excluded from the downlink physical data channel. In the remaining cases, an aggregation level of the uplink allocation information is different for each case.

For an example, when the transmission information of uplink allocation information distinguishes four different cases, an aggregation level of the uplink allocation information for a second case, a third case, and a fourth case may be 2, 4, and 8 respectively.

In an aspect of the present invention, the base station may explicitly add the transmission information of uplink allocation information to the downlink allocation information. The base station may add an transmission information of uplink allocation information bit field to a downlink allocation information bit field, and may perform transmission. The base station may not use a portion of the downlink allocation information bit field and may use the portion as the transmission information of uplink allocation information bit field. When the terminal succeeds in decoding the downlink allocation information, the terminal may be aware of the transmission information of uplink allocation information based on a value of the transmission information of uplink allocation information bit field included in the downlink allocation information.

When the transmission information of uplink allocation information distinguishes two different cases, the base station may allocate a 1 bit to the transmission information of uplink allocation information bit field. Therefore, the transmission information of uplink allocation information may be expressed by '0' or '1'. When the transmission information of uplink allocation information distinguishes three different cases, the base station may allocate two bits to the transmission information of uplink allocation information bit field. The transmission information of uplink allocation information may be expressed by three of '00', '01', '10' and '11'. When the transmission information of uplink allocation information distinguishes four different cases, the base station may allocate two bits to the transmission information of uplink allocation information bit field. The transmission information of uplink allocation information may be expressed by four of '00', '01', '10' and '11'.

In another aspect of the present invention, the base station may implicitly transmit the transmission information of uplink allocation information. The base station may apply a predefined mask to a cyclic redundancy check (CRC) of the downlink allocation information, based on the transmission information of uplink allocation information. The terminal may apply a different predefined mask to the CRC of the downlink allocation information when the terminal decodes the downlink allocation information and thus, may be aware of the transmission information of uplink allocation information. When the transmission information of uplink allocation information distinguishes two different cases, the base station and the terminal may use two different predefined masks. When the transmission information of uplink allocation information distinguishes three different cases, the base station and the terminal may use three different predefined masks. As an example, when a length of the CRC is 16, a CRC mask may be as shown in Table 1 as follows. The CRC mask of the present invention may not be limited to Table 1 and the length of the CRC and the mask may be different from Table 1.

TABLE 1

| CRC mask when a length of CRC is 16. CRC mask $\langle x_0, x_1, \ldots, x_{15} \rangle$ |
| --- |
| <0, 0, 0, 0, 0, 0, 0, 0, 0, 0, 0, 0, 0, 0, 0, 0> |
| <1, 1, 1, 1, 1, 1, 1, 1, 1, 1, 1, 1, 1, 1, 1, 1> |
| <0, 1, 0, 1, 0, 1, 0, 1, 0, 1, 0, 1, 0, 1, 0, 1> |

The terminal may transmit information indicating a downlink wireless channel characteristic to the base station to inform the base station of the downlink wireless channel characteristic. The information indicating the downlink wireless channel characteristic may be a channel quality indicator (CQI), a precoding matrix indicator (PMI), a rank indicator (RI), and the like. The base station may need some or all of the CQI, the PMI, and the RI. Accordingly, the base station may include a plurality of feedback modes that configures the downlink wireless channel characteristic that is to be transmitted by the terminal, to be different from each other. The base station may transmit one of the plurality of feedback modes to the terminal, and the terminal may feed back the information indicating the downlink wireless channel characteristic, based on the received feedback mode. In an aspect of the present invention, the base station may transmit the feedback mode to the terminal through higher layer signaling. According to the 3rd generation partnership project (3 GPP), the higher layer signaling may be RRC signaling. The terminal may transmit the information indicating the downlink wireless channel characteristic, based on the feedback mode received from the base station.

The base station may transmit the downlink physical data channel to the terminal using a plurality of different transmission schemes, based on a state of a wireless channel. The plurality of transmission schemes may include a space-time block code (STBC) scheme, an open loop spatial multiplexing (SM) scheme, a closed loop SM scheme, a beamforming scheme, and the like. The base station may transmit a transmission mode to the terminal, and the transmission mode may be used when the base station transmits the downlink physical data channel to the terminal. In an aspect of the present invention, the base station may transmit the transmission mode using the higher layer signaling. According to the 3GPP, the higher layer signaling may be RRC signaling.

In an aspect of the present invention, each transmission scheme may be used as a transmission mode. In this example, the base station may transmit the downlink physical data channel to the terminal using only a single transmission scheme. Also, a plurality of transmission schemes may be used as a single transmission mode. In this example, the base station may transmit the downlink physical data channel to the terminal based on the plurality of transmission schemes included in the transmission mode. The terminal may decode the downlink physical data channel based on the transmission mode received from the base station.

The base station may divide a total resource which has a possibility of being used for transmission of a physical downlink control channel (PDCCH) into a plurality of divided resources, and some or all of the plurality of divided resources may overlap each other. In this example, the total resource which has a possibility of being used for the transmission of the PDCCH may be referred to as a PDCCH total resource, and each of the plurality of divided resources may be referred to as a PDCCH group resource. A plurality of PDCCHs may be transmitted using the PDCCH group resource. The base station may transmit the PDCCHs using the same or different schemes based on the PDCCH group resource. For example, the PDCCHs may be dispersively arranged in resources that are spaced away from each other, to obtain a diversity gain. For another example, the PDCCHs may be arranged in adjacent resources, to obtain a frequency selective gain. In this example, the resource may be constituted as a combination of a time resource, a frequency resource, a space resource, a code resource, and the like. The present invention may not be limited to the above described resource arrangement method.

The base station may transmit a location of the PDCCH total resource to the terminal. Also, the PDCCH total resource may include a few PDCCH group resources, and the base station may transmit, to the terminal, a location of each of the PDCCH group resources. The base station may also transmit, to the terminal, serial numbers assigned to each of the PDCCH group resources. In an aspect of the present invention, the base station may transmit, to the terminal, the information using higher layer signaling. According to the 3GPP, the higher layer signaling may be the RRC signaling.

The base station may transmit the PDCCH to the terminal in different schemes based on a downlink wireless channel state. Accordingly, the terminal may not search the PDCCH total resource for the PDCCH, and may search a predetermined PDCCH group resource and thus, may reduce power consumption. The base station may inform the terminal of a serial number of a PDCCH group resource which has a possibility of being used for transmission of the PDCCH. The serial number of the PDCCH group resource transferred by the base station may be a single serial number or a plurality of serial numbers.

The base station may inform the terminal of the serial number of the PDCH group resource based on two methods. In a first method, the base station directly transfers the serial number of the PDCCH group resource to the terminal through higher layer signaling. According to the 3GPP, the higher layer signaling may be RRC signaling. In a second method, the serial number of the PDCCH group resource is connected to a transmission mode or a feedback mode, and when the base station transmits the transmission mode or the feedback mode to the terminal, the terminal may indirectly recognize the serial number of the PDCCH group resource.

The base station may dispersively arrange the PDCCHs in resources that are spaced away from each other, to obtain a diversity gain. The base station may arrange the PDCCHs in adjacent resources, to obtain a frequency selective gain. In this example, the resource may be constituted based on a combination of a time resource, a frequency resource, a space resource, a code resource, and the like. The present invention may not be limited to the resource arrangement method in the forgoing. As described above, the PDCCHs may be transmitted in different schemes.

Examples of the PDCCH may include a downlink allocation information physical control channel, an uplink allocation information physical control channel, and the like. A transmission scheme of the downlink allocation information physical control channel and a transmission scheme of the uplink allocation information physical control channel may be determined based on a transmission of a downlink physical data channel.

The PDCCH may include a plurality of resources, for example, a resource element (RE), a resource element group (REG), and the like in the 3GPP, and resources of PDCCHs with respect to different terminals may coexist in a single unit resource, for example, a physical resource block (PRB), a PRB-pair and the like, including a plurality of resources. A number of unit resources including resources of PDCCHs for different terminals may be determined based on a number of terminals included in a cell, a transmission scheme of a PDCCH, a utilization rate of resources, a system bandwidth, and the like. For example, the number of unit resources including resources of PDCCHs for different terminals may be as shown in Table 2 as follows.

TABLE 2

Example of the number of unit resources including resources of PDCCHs for different terminals

| $N_{RB}^{DL}$ | SYSTEM BANDWIDTH | | | | | |
|---|---|---|---|---|---|---|
| NUMBER OF UNIT RESOURCES | 6 | 15 | 25 | 50 | 75 | 100 |
| $[N_{RB}^{DL}/5]$ | 2 | 3 | 5 | 10 | 15 | 20 |
| $[N_{RB}^{DL}/10]$ | 1 | 2 | 3 | 5 | 8 | 10 |
| $[N_{RB}^{DL}/25]$ | 1 | 1 | 1 | 2 | 3 | 4 |

Table 2 may also be expressed in the form of Table 3 as shown below. The entries, '12' and '18', which indicate the number of unit resources in Table 3 are added, to decrease a difference between the number of unit resources corresponding to the respective entries.

TABLE 3

Example of the number of unit resources including resources of PDCCHs for different terminals

| | SYSTEM BANDWIDTH $N_{RB}^{DL}$ | | | | | |
|---|---|---|---|---|---|---|
| | 6 | 15 | 25 | 50 | 75 | 100 |
| SET OF NUMBER OF UNIT RESOURCES | {1, 2} | {1, 2, 3} | {1, 3, 5} | {2, 5, 8, 10} | {3, 5, 8, 10, 12, 15} | {4, 8, 10, 12, 15, 18, 20} |

A number of resources that is used for transmission of the downlink allocation information physical control channel among resources included in the unit resources may be different from each other. When a number of unit resources including resources of downlink allocation information of physical control channels for different terminals is equalized to a number of unit resources including resources of uplink allocation information of physical control channels for different terminals, resources may be wasted. Therefore, to avoid waste of the resources, the number of unit resources including resources of downlink allocation information of physical control channels for different terminals may be determined to be different from the number of unit resources including resources of uplink allocation information of physical control channels for different terminals.

The base station may transmit, to the terminal, the number of unit resources including resources of downlink allocation information of physical control channels for different terminals and the number of unit resources including resources of uplink allocation information of physical control channels for different terminals. In an aspect of the present invention, the base station may transmit the number of unit resources including resources of downlink allocation information of physical control channels for different terminals and the number of unit resources including resources of uplink allocation information of physical control channels for different terminals, through higher layer signaling. According to the 3GPP, the higher layer signaling may be RRC signaling.

The base station may transmit only the number of unit resources including resources of downlink allocation information physical control channels for different terminals, and the terminal may derive the number of unit resources including resources of uplink allocation information of physical control channels for different terminals based on the value received from the base station, and a ratio between a number of resources included in the unit resources including resources of downlink allocation information of physical control channels for different terminals and a number of resources included in the unit resources including resources of uplink allocation information physical of control channels for different terminals.

The system bandwidth may include a plurality of unit resources, for example, a plurality of PRBs in the 3GPP. A single sub-frame may include a plurality of unit resources. The plurality of unit resources may be grouped as a unit resource group, for example, a resource block group (RBG) in the 3GPP. For ease of description, a number of unit resources included in the unit resource group may be referred to as P, and P may be 1, 2, 3, 4, and the like, which may vary based on the system bandwidth. A number of unit resources included in a last unit resource group may be less than or equal to P, based on the system bandwidth. The system bandwidth may include a plurality of unit resource groups, and the unit resource groups constituting the system bandwidth may be classified into P subsets. A number of unit resources included in the system bandwidth may be BW.

The base station may transmit, to the terminal, the PDCCH using one or the plurality of unit resources. In an aspect of the present invention, the base station may transmit the PDCCH by utilizing one unit resource for each unit resource group. For example, the base station may transmit the PDCCH by selecting a first unit resource, a second unit resource, a third unit resource, or a fourth unit resource among the plurality of unit resources included in a unit resource group.

Figure 4:
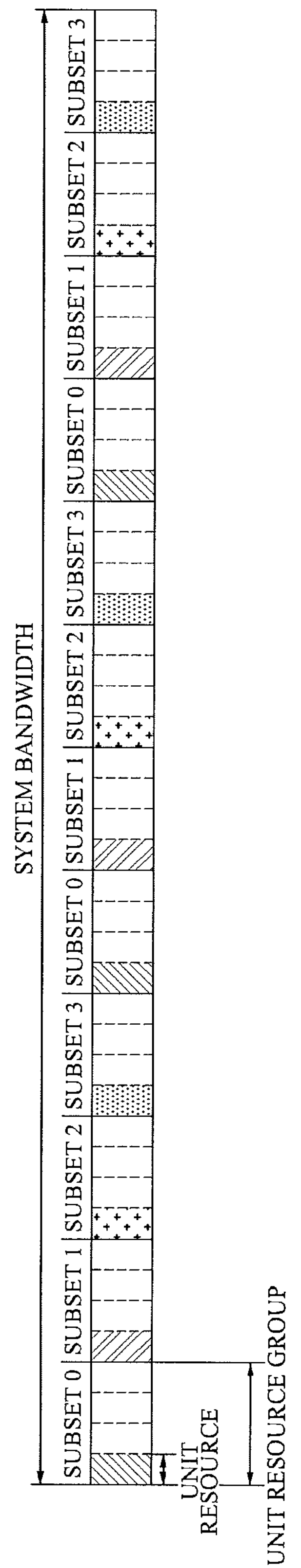
FIG. 4 illustrates an example where a base station transmits a PDCCH using four unit resources.
Figure 5:
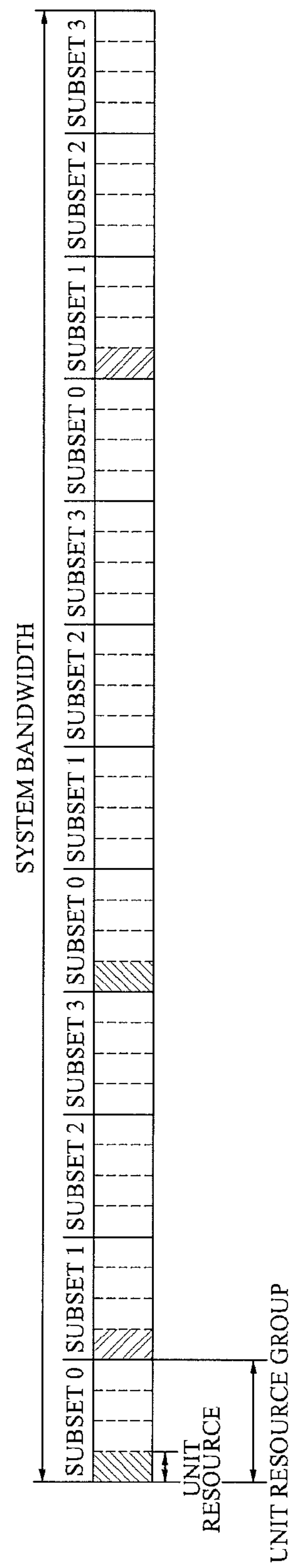
FIG. 5 illustrates an example where a base station transmits a PDCCH using two unit resources.

FIG. 3 illustrates an example where a base station transmits a PDCCH using a single unit resource. FIG. 4 illustrates an example where the base station transmits the PDCCH using four unit resources. FIG. 5 illustrates an example where the base station transmits the PDCCH using two unit resources.

When the base station transmits the PDCCH using the single unit resource, the PDCCH may be transmitted as illustrated in FIG. 3. Here, different patterns may indicate different PDCCHs. For ease of description, FIG. 3 illustrates four PDCCHs and a maximum number of PDCCHs may be $\lceil BW/P \rceil$.

When the base station transmits, to the terminal, the PDCCH using a plurality of unit resources, the base station may transmit the PDCCH using a unit resource group having the same subset.

When the base station transmits, to the terminal, the PDCCH using four unit resources, an interval between unit resources that is used for transmission of the PDCCH may be P2. In FIG. 4 different patterns may indicate different PDCCHs. For ease of descriptions, FIG. 4 illustrates four PDCCHs. A maximum number of PDCCHs may be $\lceil BW/(4P) \rceil$.

When the base station transmits the PDCCH using two unit resources, an interval between unit resources that is used for transmission of the PDCCH may be $P^2$ or $2P^2$. In FIG. 5 different patterns may indicate different PDCCHs. For ease of description, FIG. 5 illustrates two PDCCHs. A maximum number of PDCCHs may be $\lceil BW/2P \rceil$.

In an aspect to the present invention, the base station may transmit, to the terminal, a location and a number of unit resources which have a possibility of being used for transmission of the PDCCH. In this example, the terminal may perform blind-decoding within an area that is used for transmission of the PDCCH which is received from the base station, to search for the PDCCH.

In another aspect of the present invention, the base station may not transmit the location and the number of unit resources which have a possibility of being used for transmission of the PDCCH. In this example, the terminal may perform blind-decoding with respect to a whole system bandwidth to search for the PDCCH. The terminal may perform blind-decoding with respect to the whole bandwidth or a whole area that is used for transmission of the PDCCH which is received from the base station. When a search area dedicated by a terminal exists, the terminal may perform blind-decoding with respect to a portion of the area or the system bandwidth that is used for transmission of the PDCCH.

The terminal may perform blind-decoding by changing a number of unit resources which have a possibility of being used for transmission of the PDCCH. The number of candidates which have a possibility of being used for transmission based on the number of unit resources which have a possibility of being used for transmission of the PDCCH.

The base station may transfer a resource which has a possibility of being used for the transmission of the PDCCH, using a resource allocation scheme identifier and a resource allocation indicator. The resource allocation scheme identifier and the resource allocation indicator may be transferred through higher layer signaling, for example, RRC signaling in the 3GPP. The resource allocation scheme identifier and the resource allocation indicator may be configured based on the following three schemes.

In a first scheme, the resource allocation scheme identifier identifies two cases that include a case indicating a resource allocation scheme 0 or a resource allocation scheme 1 and a case indicating a resource allocation scheme 2. In this example, the resource allocation schemes 0, 1 and 2 may indicate resource allocation types 0, 1 and 2 of 3GPP TS 36.212 and 3GPP TS 36.213, respectively.

In the first scheme, the resource allocation indicator may indicate resource allocation based on a resource allocation scheme indicated by the resource allocation scheme identifier. When the resource allocation scheme identifier indicates the resource allocation scheme 0 or the resource allocation scheme 1, the resource allocation indicator may be configured to include a resource allocation header and a resource block assignment of a DCI format 1 or a DCI format 2. In this example, the DCI format 1 and the DCI format 2 may be defined in the 3GPP TS 36.212. When the resource allocation scheme identifier indicates the resource allocation scheme 2, the resource allocation indicator may be configured to include a localized/distributed virtual resource block (VRB) assignment flag and a resource block assignment of a DCI format 1B or a DCI format 1D. In this example, the DCI format 1B and the DCI format 1D may be defined in the 3GPP TS 36.212. A bit size of the resource allocation indicator may vary based on the resource allocation scheme 0, 1 and 2 and a downlink system bandwidth.

In a second scheme, the resource allocation scheme identifier identifies three cases that include a case indicating the resource allocation scheme 0, a case indicating the resource allocation scheme 1 and a case indicating the resource allocation scheme 2. In this example, the resource allocation schemes 0, 1 and 2 may indicate resource allocation types 0, 1 and 2 of 3GPP TS 36.212 and 3GPP TS 36.213, respectively.

In the second scheme, the resource allocation indicator may indicate resource allocation based on a resource allocation scheme indicated by the resource allocation identifier. When the resource allocation scheme identifier indicates the resource allocation scheme 0 or the resource allocation scheme 1, the resource allocation indicator may be configured to include the resource block assignment of the DCI format 1 or the DCI format 2. Unlike the resource allocation indicator of the first scheme, the resource allocation header may not be included. In this example, the DCI format 1 and the DCI format 2 may be defined in the 3GPP TS 36.212. When the resource allocation scheme identifier indicates the resource allocation scheme 2, the resource allocation indicator may be configured to include the localized/distributed VRB assignment flag and the resource block assignment of the DCI format 1B or the DCI format 1D. In this example, the DCI format 1B and the DCI format 1D may be defined in the 3GPP TS 36.212. A bit size of the resource allocation indicator may vary based on the resource allocation schemes 0, 1 and 2 and the downlink system bandwidth.

In a third scheme, the resource allocation scheme identifier identifies four cases including a case indicating the resource allocation scheme 0, a case indicating the resource allocation scheme 1, a case indicating the resource allocation scheme 2 and the localized VRB, and a case indicating the resource allocation scheme 2 and the distributed VRB. In this example, the resource allocation schemes 0, 1 and 2 may indicate the resource allocation types 0, 1 and 2 of the 3GPP TS 36.212 and 3GPP TS 36.213.

In the third scheme, the resource allocation indicator may indicate resource allocation based on a resource allocation scheme indicated by the resource allocation scheme identifier. When the resource allocation scheme identifier indicates the resource allocation scheme 0 or the resource allocation scheme 1, the resource allocation indicator may be configured to include the resource block assignment of the DCI format 1 or the DCI format 2. Unlike the resource allocation indicator of the first scheme, the resource allocation header may not be included. In this example, the DCI format 1 and the DCI format 2 may be defined in the 3GPP TS 36.212. When the resource allocation scheme identifier indicates the resource allocation scheme 2, that is, when the resource allocation scheme identifier indicates the resource allocation scheme 2 and the localized VRB or indicates the resource allocation scheme and the distributed VRB, the resource allocation indicator may be configured to include the resource block assignment of the DCI format 1B or the DCI format 1D. Unlike the resource allocation indicator of the first scheme and the second scheme, the localized/distributed VRB assignment flag may not be included. In this example, the DCI format 1B and the DCI format 1D may be defined in the 3GPP TS 36.212. A bit size of the resource allocation indicator may vary based on the resource allocation schemes 0, 1 and 2.

The terminal may recognize a resource of the PDCCH transmitted from the base station based on the described schemes, and may perform blind-decoding with respect to the resource to determine whether a PDCCH associated with the terminal exists.

A transmission mode of a downlink physical data channel may be changed based on a reference signal that is used for decoding of the downlink physical data channel Examples of the reference signal may include a cell-specific reference signal (CRS) and a demodulation reference signal (DM-RS). When the same reference signal is used for decoding the downlink physical data channel, a plurality of transmission modes associated with the downlink physical data channel may be used.

When the reference signal used for decoding the downlink physical data channel is the DM-RM, a location and a number of resources of the DM-RS, for example, a number of REs in the 3GPP, used in a single unit resource, for example, a PRB-pair in the 3GPP, may be different based on a number of antenna ports of the DM-RS. For an example, in the 3GPP, when the number of antenna ports of the DM-RS is one or two, twelve REs are used for each PRB-pair, and when the number of antenna ports of the DM-RS is in the range of three to eight, 24 REs are used for each PRB-pair.

The location and the number of resources used for transmission of the PDCCH that is transmitted from the base station to the terminal may be different based on the number of antenna ports of the DM-RS that is used for decoding the downlink physical data channel. Accordingly, the terminal may be able to decode the PDCCH when the terminal is aware of the number of antenna ports of the DM-RS that is used for decoding the downlink physical data channel. The terminal may be aware of the number of antenna ports of the DM-RS used for decoding the downlink physical data channel, through the PDCCH transmitted from the base station to the terminal. Accordingly, the base station may inform the terminal, in advance, of the number of antenna ports of the DM-RS used for decoding the downlink physical data channel.

The base station may inform the terminal of the number of antenna ports of the DM-RS used for decoding of the downlink physical data channel based on two methods. A first method, which is an explicit method, may directly transfer the number of antenna ports of the DM-RS used for decoding of the downlink physical data channel, through higher layer signaling. In the 3GPP, the higher layer signaling may be RRC signaling. In this example, the number of DM-RS antenna ports may be expressed by two cases. Here, the cases include, a case indicating the number of antenna ports of the DM-RS is one or two and a case indicating the number of antenna ports of the DM-RS is three or more.

When the number of antenna ports of the DM-RS, which is transmitted by the base station through the higher layer signaling, is one or two, the terminal may exclude a DM-RS resource of when the number of antenna ports of the DM-RS is one or two, and may decode the PDCCH. When the number of the antenna ports of the DM-RS, which is transmitted by the base station through the higher layer signaling, is three or more, the terminal may exclude a DM-RS resource of when the number of antenna ports of the DM-RS is three or more, and may decode the PDCCH.

A second method, which is an implicit method, may indirectly transfer the number of antenna ports of the DM-RS used for decoding the downlink physical data channel, based on a transmission mode of the downlink physical data channel. The transmission mode associated with the downlink physical data channel may be transferred through the higher layer signaling. In the 3GPP, the higher layer signaling may be the RRC signaling. When the reference signal used for decoding the downlink physical data channel is the DM-RS, a plurality of transmission modes associated with the downlink physical data channel may be used. The number of antenna ports of the DM-RS may be different based on the transmission mode of the downlink physical data channel. A transmission mode of the downlink physical data channel may use one or two antenna ports of the DM-RS. Another transmission mode of the downlink physical data channel may use one to eight antenna ports of the DM-RS.

Therefore, when the base station transfers, to the terminal, a transmission mode of the downlink physical data channel that corresponds to the case where one or two antenna ports of the DM-RS are used, the terminal may exclude a DM-RS resource of when the number of antenna ports of the DM-RS is one or two, and may decode the PDCCH. When the base station transfers, to the terminal, a transmission mode of the downlink physical data channel that corresponds to the case where one to eight antenna ports of the DM-RS are used, the terminal may exclude a DM-RS resource of when the number of antenna ports of the DM-RS is three or more, and may decode the PDCCH.

FIGS. 6 through 11 illustrate an example where a base station allocates a single unit resource set to a terminal, and the base station transmits a PDCCH using a resource in the unit resource set.

The base station allocates the single unit resource set to the terminal, and may transmit the PDCCH using the resource included in the unit resource set. In the 3GPP, a unit resource may be a VRB. The unit resource sets may or may not be adjacent to each other in a frequency band. The unit resource set for each terminal may be different, and the same unit resource set may be allocated to different terminals.

An aggregation level may denote a number of unit resources used for transmission of a single PDCCH and the aggregation level may configured as an aggregation level 1, an aggregation level 2, an aggregation level 4, an aggregation level 8 and the like. An area which has a possibility of being used for transmission of PDCCH candidates, in a single unit resource set, may be referred to as a search space. A unit resource index of a search space where a PDCCH candidate m of which the aggregation level is L is located may be expressed as shown in Equation 1.

$$(L\cdot(m\times K_L i_{offset,L})+i)\bmod N \qquad \text{[Equation 1]}$$

where i=0, 1, . . . , L−1 and m=0, 1, . . . $M_L-1$

In Equation 1, N denotes a number of unit resources included in a unit resource set that the base station transmits to the terminal, the unit resource index in the unit resource set may be 0, 1, . . . , and N−1. L may denote the aggregation level, m may denote an index of the PDCCH candidate, $i_{offset,L}$ and may denote a location offset of a PDCCH candidate of when the aggregation level is L in the unit resource set. $K_L$ may be a number of offsets, and may vary based on the aggregation level. i=0, 1, . . . , L−1 denotes that respective PDCCH candidates having the aggregation level of L are allocated to successive L unit resources within the unit resource set.

The number of PDCCH candidates having the aggregation level of L in the search space may vary based on a number of offsets, an aggregation level, and a number of unit resources included in the unit resource set that the base station transmits to the terminal, which is expressed by Equation 2.

$$M_L=\left\lceil\frac{N}{L\times K_L}\right\rceil \qquad \text{[Equation 2]}$$

In Equation 2, N denotes the number of unit resources included in the unit resource set, L denotes the aggregation level, $M_L$ denotes the number of PDCCH candidates having the aggregation level of L. $K_L$ denotes the number of offsets and may vary based on the aggregation level.

$i_{offset,L}$, which denotes a location offset of a PDCCH candidate when the aggregation level is L in the unit resource set, may be expressed by Equation 3.

$$i_{offset,L}=(ID)\bmod K_L \qquad \text{[Equation 3]}$$

In this example, ID denotes an identifier assigned by the base station to the terminal. In the 3GPP, the identifier may be a radio network temporary identifier (RNTI) and thus, a cell-RNTI (C-RNTI), a semi-persistent scheduling C-RNTI (SPS C-RNTI), and the like may be used. $K_L$ denotes the number of offsets, and may vary based on the aggregation level.

Figure 6:
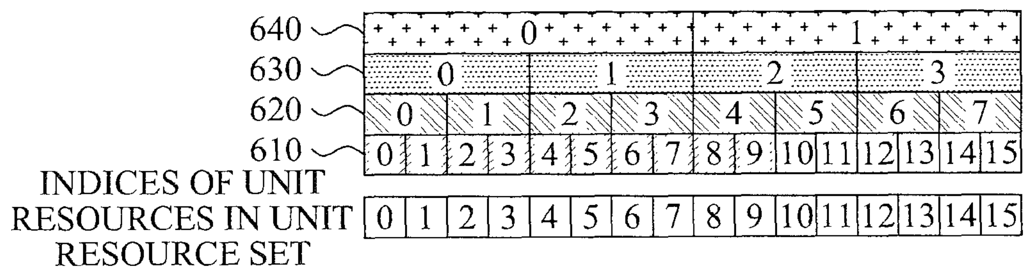
FIGS. 6 through 11 illustrate an example where a base station allocates a single unit resource set to a terminal, and the base station transmits a PDCCH using a resource in the unit resource set.

An embodiment of the present invention will be described with reference to FIG. 6. It is assumed that the aggregation level is L=1, 2, 4, 8, the number of unit resources included in the unit resource set that the base station transmits to the terminal is N=16, and the number of offsets is $K_1=K_2=K_4=K_8=1$. The number of PDCCH candidates ($M_L$) is $M_1=16$, $M_2=8$, $M_4=4$, and $M_8=2$. $i_{offset,L}$ indicates the location offset of the PDCCH candidate when the aggregation level is L in the unit resource set, may always be zero, regardless of the aggregation level and the identifier of the terminal. A location of the PDCCH candidate may be determined based on Equation 1 as shown in FIG. 6. A number included in a PDCCH of FIG. 6 denotes m that is an index of the PDCCH candidate. A number of unit resources that is used for transmission of a single PDCCH may be equivalent to the aggregation level.

Figure 7:
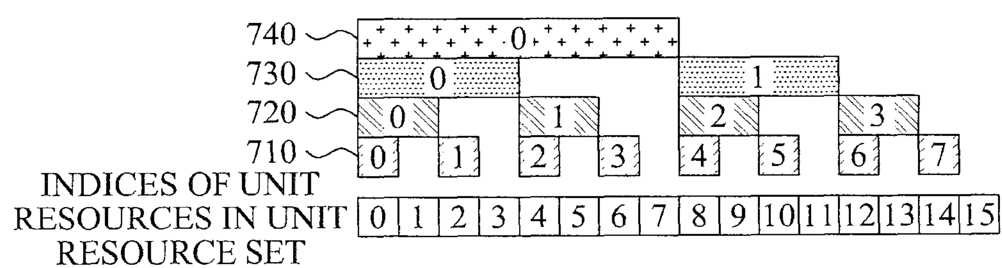

An embodiment of the present invention will be described with reference to FIG. 7. Here, it is assumed that the aggregation level is L=1, 2, 4, 8, the number of unit resource sets that the base station transmits to the terminal is N=16, and the number of offsets is $K_1=K_2=K_4=K_8=2$. $M_L$ may be $M_1=8$, $M_2=4$, $M_4=2$, and $M_8=1$ based on Equation 2. Since the identifier of the terminal is assumed to be an even number and thus, $i_{offset,L}$ is L in the unit resource set and may be $i_{offset,1}=i_{offset,2}=i_{offset,4}=i_{offset,8}=0$ based on Equation 3. A location of the PDCCH candidate may be determined based on Equation 1 as shown in FIG. 7, based on Equation 1. A number included in a PDCCH of FIG. 7 denotes m which is an index of the PDCCH candidate. A number of unit resources that is used for transmission of a single PDCCH may be equivalent to the aggregation level.

Figure 8:
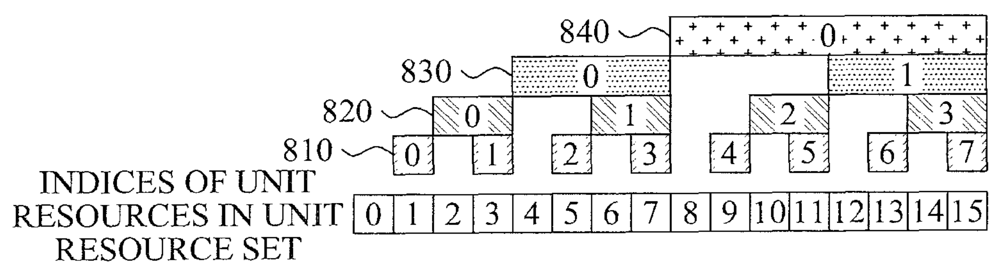

An embodiment of the present invention will be described with reference to FIG. 8. It is assumed that the aggregation level is L=1, 2, 4, 8, the number of unit resources included in the unit resource set that the base station transmits to the terminal is N=16, and the number of offsets is $K_1=K_2=K_4=K_8=2$. Also, an identifier of the terminal may be assumed to be an odd number. $M_L$ may be $M_1=8$, $M_2=4$, $M_4=2$, and $M_8=1$, based on Equation 2. Since the identifier of the terminal is assumed to be the odd number and thus, $i_{offset,L}$ that denotes the location offset of the PDCCH candidate of when the aggregation level is in the unit resource set may be $i_{offset,1}=i_{offset,2}=i_{offset,4}=i_{offset,8}=1$, based on Equation 3. A location of the PDCCH candidate may be determined based on Equation 1 as shown in FIG. 8. A number included in a PDCCH of FIG. 8 may denote m that is an index of the PDCCH candidate. A number of unit resources that is used for transmission of a single PDCCH may be equivalent to the aggregation level.

Figure 9:
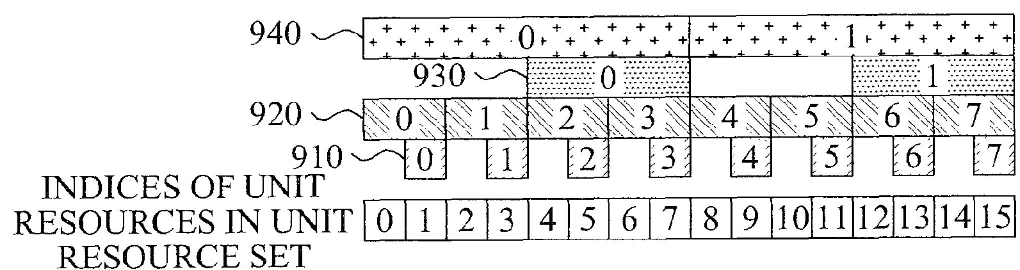
Figure 10:
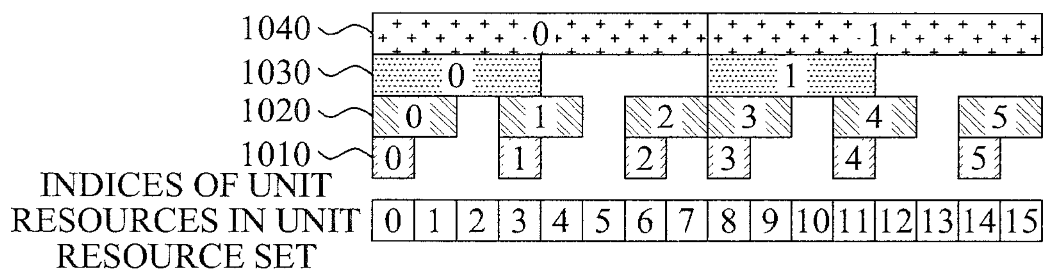
Figure 11:
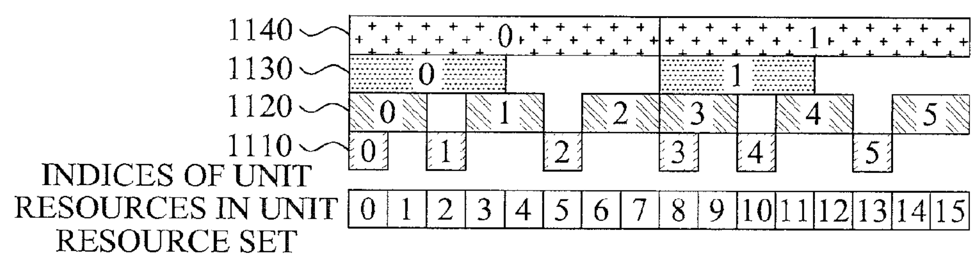

An embodiment of the present invention will be described with reference to FIG. 9. It is assumed that the aggregation level is L=1, 2, 4, 8, the number of unit resources included in the unit resource set that the base station transmits to the terminal is N=16, the number of offsets is $K_1=K_4=2$ and $K_2=K_8=1$. Also, an identifier of the terminal is assumed to be an odd number. $M_L$ may be $M_1=8$, $M_2=8$, $M_4=2$, and $M_8=2$, based on Equation 2. Since the identifier of the terminal is assumed to be the odd number, $i_{offset,L}$ that denotes the location offset of the PDCCH candidate of when the aggregation level is L may be $i_{offset,1}=i_{offset,4}=1$ and $i_{offset,2}=i_{offset,8}=0$. A location of the PDCCH candidate may be determined based on Equation 1 as shown in FIG. 9. A number included in a PDCCH of FIG. 9 denotes m in that is an in an index of the PDCCH candidate. A number of unit resources that is used for transmission of a single PDCCH may be equivalent to the aggregation level.

Even though it is assumed $M_L$ that corresponding to the number of PDCCH candidates of which the aggregation level is L in the search space is determined based on Equation 2, the present invention may also include randomly determining of $M_L$ corresponding to the number of PDCCH candidates of which the aggregation level is L in the search space. Even though it is assumed that $i_{offset,L}$ that denotes the location offset of the PDCCH of when the aggregation level is L in the unit resource set is determined based on Equation 3, the present invention may also include directly transmitting $i_{offset,L}$ from the base station to the terminal through the higher layer signaling. In the 3GPP, the higher layer signaling may be RRC signaling. The base station may transmit, to the terminal, the location offset of a PDCCH candidate for each aggregation level. The base station may transmit, to the terminal, a location offset of a single PDCCH candidate that is equivalently applied to all aggregation levels.

The PDCCH candidate in the unit resource set that the base station allocates to the terminal may be based on Equation 10 or Equation 11, as opposed to being based on Equation 1, Equation 2, and Equation 3. In Equation 10 and Equation 11, the aggregation level may be L=1, 2, 4, 8, and $M_1=M_2=6$ and $M_4=M_8=2$.

Figure 12:
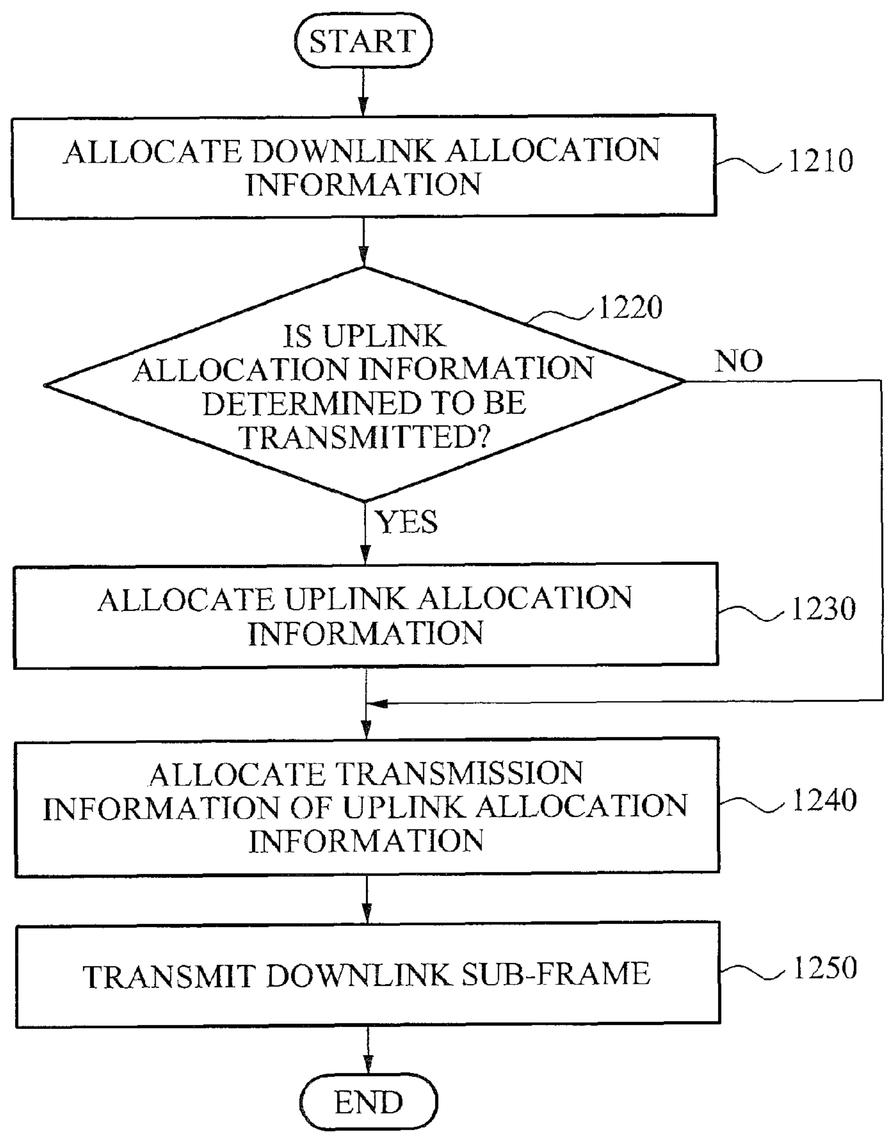
FIG. 12 is a flowchart illustrating a method for operation of a base station according to an embodiment.

FIG. 12 illustrates a method for operation of a base station according to an embodiment.

In operation 1210, the base station allocates downlink allocation information to a downlink sub-frame. The downlink allocation information may be control information, and may include hybrid automatic repeat request information, a modulation and demodulation scheme, information associated with a location of a resource of a downlink physical data channel transmitted from the base station to the terminal, and the like.

In operation 1220, the base station may determine whether to transmit uplink allocation information using the downlink sub-frame. The uplink allocation information may include hybrid automatic repeat request information, a coding and decoding scheme, and information associated with a location of a resource of an uplink physical data channel transmitted from the terminal to the base station, and the like. In this example, the resource may be configured as a combination of a time resource, a frequency resource, a space resource, a code resource, and the like.

When the base station determines to transmit the uplink allocation information using the downlink sub-frame, the base station may allocate the uplink allocation information to the downlink sub-frame in operation 1230. In an aspect of the present invention, the base station may allocate the uplink allocation information to the same frequency band as the downlink allocation information.

In an aspect of the present invention, a plurality of terminals may access the base station. In this example, the downlink allocation information and the uplink allocation information may be associated with different terminals with each other. The uplink allocation information included in the downlink sub-frame may be allocation information with respect to a first terminal included in the plurality of terminals, and the downlink allocation information may be allocation information with respect to a second terminal included the plurality of terminals.

The base station may insert transmission information of uplink allocation information to the downlink allocation information in operation 1240. The transmission information of uplink allocation information may be information indicating whether the uplink allocation information is transmitted using the downlink sub-frame.

The terminal may determine whether the uplink allocation information is transmitted using the downlink sub-frame, based on the transmission information of uplink allocation information inserted to the downlink control information.

In an aspect of the present invention, the transmission information of uplink allocation information may be explicitly transmitted. In this example, the base station may add an transmission information of uplink allocation information bit field to a downlink allocation information bit field included in the downlink sub-frame. The base station may not use a portion of the downlink allocation information bit field and use the portion as the transmission information of uplink allocation information bit field. The transmission information of uplink allocation information may be transmitted using the transmission information of uplink allocation information bit field.

In another aspect of the present invention, the transmission information of uplink allocation information may be implicitly transmitted. In this example, the base station may apply a mask to a CRC of the downlink allocation information, based on whether the uplink allocation information is transmitted.

Therefore, a value of the mask applied to the CRC may be the transmission information of uplink allocation information.

In operation 1250, the base station may transmit the downlink sub-frame to the terminal.

Figure 13:
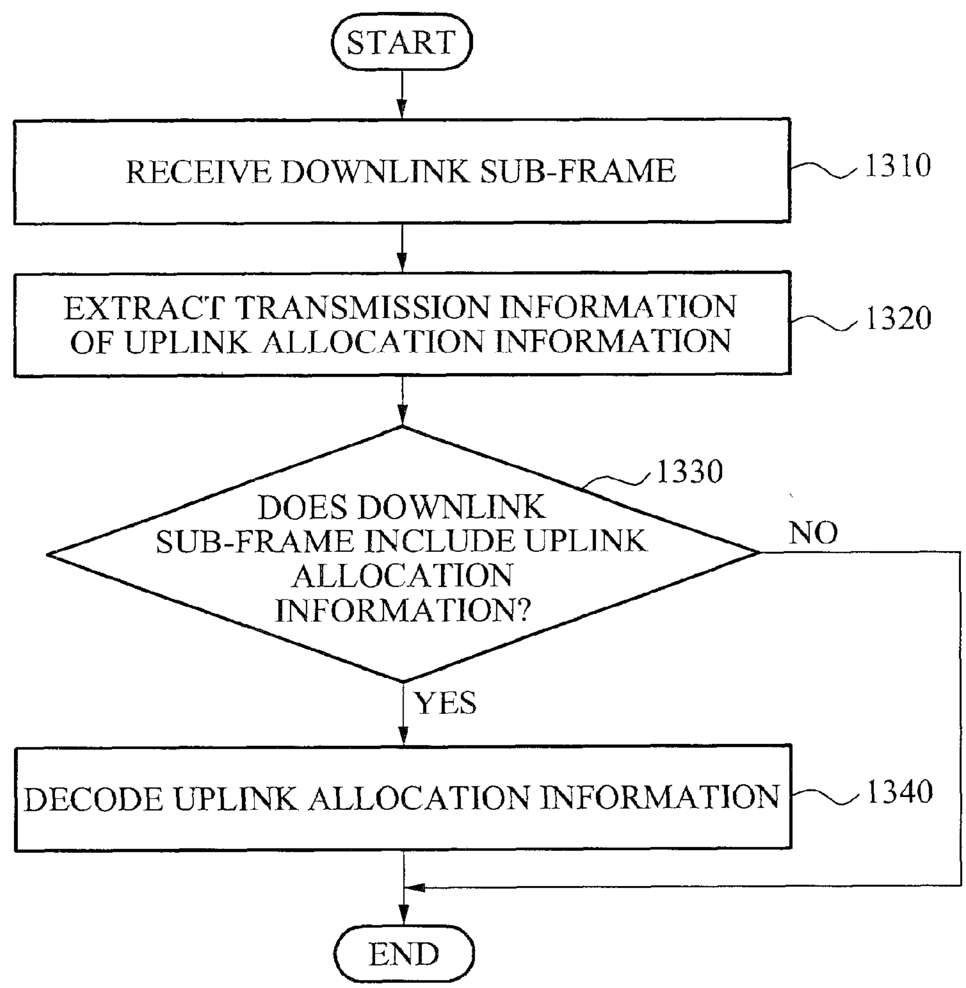
FIG. 13 is a flowchart illustrating a method for operation of a terminal according to an embodiment.

FIG. 13 illustrates a method for operation of a terminal according to an embodiment.

In operation 1310, the terminal may receive a downlink sub-frame from the base station. The downlink sub-frame may include downlink allocation information. In an aspect of the present invention, the transmission information of uplink allocation information may be included in the downlink allocation information and may be transmitted.

In operation 1320, the terminal may extract transmission information of uplink allocation information from the downlink allocation information.

In an aspect of the present invention, the transmission information of uplink allocation information may be explicitly transmitted. In this example, the transmission information of uplink allocation information may be transmitted using an transmission information of uplink allocation information bit field that is added to a downlink allocation information bit field included in the downlink sub-frame. The transmission information of uplink allocation information may be transmitted by using a portion of the downlink allocation information bit field included in the downlink sub-frame as the transmission information of uplink allocation information bit field.

In another aspect of the present invention, the transmission information of uplink allocation information may be implicitly transmitted. In this example, the transmission information of uplink allocation information may be transmitted based on a mask that applies to a CRC. A value of the transmission information of uplink allocation information may be determined based on a value of the mask applied to the CRC.

In operation 1330, the terminal may determine whether the uplink allocation information is included in the downlink sub-frame, based on the transmission information of uplink allocation information.

In operation 1340, the terminal may decode the uplink allocation information based on the determination in operation 1330. The uplink allocation information may be allocated to the same frequency band as the downlink allocation information.

The terminal may only decode the downlink allocation information, and may determine whether the uplink allocation information is transmitted. Accordingly, when the uplink allocation information is not transmitted, unnecessary operations may not be performed and thus, power consumption may decrease.

Figure 14:
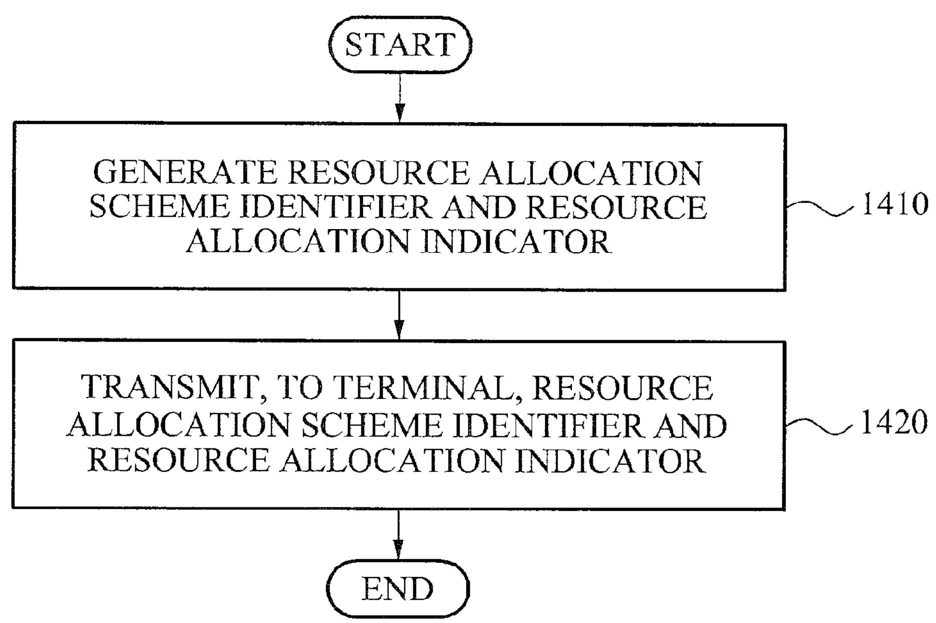
FIG. 14 is a flowchart illustrating a method for operation of a base station according to another embodiment.

FIG. 14 illustrates a method for operation of a base station according to another embodiment.

In operation 1410, the base station may determine a radio resource to be allocated to a terminal. The base station may determine a resource allocation scheme that informs the terminal of the allocated radio resource. The base station may generate a resource allocation scheme identifier based on the deter mined resource allocation scheme, and may generate a resource allocation indicator based on the resource allocation scheme identifier. The resource allocation scheme identifier may indicate information associated with a resource allocation type.

Examples will be provided based on the resource allocation scheme identifier.

1) Resource allocation scheme identifier that identifies two cases.

In this example, the resource allocation scheme identifier may identify two cases that includes a first case where the resource allocation type is '0' or '1' and a second case where the resource allocation type is '2'.

When the resource allocation scheme identifier indicates that the resource allocation type is '0' or '1', the base station may configure the resource allocation indicator to include a resource allocation header and a resource block assignment of a DCI format 1 or a DCI format 2 of the 3GPP TS 36.212.

When the resource allocation scheme identifier indicates that the resource allocation type is '2', the base station may configure the resource allocation indicator to include a localized/distributed VRB assignment flag and a resource block assignment of a DCI format 1B or a DCI format 1D of the 3GPP TS 36.212.

A length of the resource allocation indicator, that is, a size of bit allocated to the resource allocation indicator, may vary based on a value of the resource allocation type and the downlink system bandwidth.

2) Resource allocation scheme identifier that identifies three cases.

In this example, the resource allocation scheme identifier may identify resource allocation types 0, 1 and 2.

When the resource allocation scheme identifier indicates that the resource allocation type is '0' or '1', the base station may configure the resource allocation indicator to include the resource block assignment of a DCI format 1 or a DCI format 2 of the 3GPP TS 36.212.

When the resource allocation scheme identifier indicates the resource allocation type is '2', the base station may configure the resource allocation indicator to include the localized distributed VRB assignment flag and the resource block assignment of the DCI format 1B or the DCI format 1D of the 3GPP TS 36.212.

A length of the resource allocation indicator, that is, a size of bit allocated to the resource allocation indicator, may vary based on a value of the resource allocation type and the downlink system bandwidth.

3) Resource allocation scheme identifier that identifies four cases.

In this example, the resource allocation scheme identifier may identify four cases that includes a case indicating that the resource allocation type is '0', a case indicating that the resource allocation type is '1', a case indicating that the resource allocation type is '2' and corresponds to a localized VRB, and a case indicating that the resource allocation type is '2' and corresponds to a distributed VRB.

When the resource allocation scheme identifier indicates that the resource allocation type is '0' or '1', the base station may configure the resource allocation indicator to include the resource block assignment of the DCI format 1 or the DCI format 2 of the 3GPP TS 36.212.

The resource allocation scheme identifier indicates that the resource allocation type is '2', the base station may configure the resource allocation indicator to include the resource block assignment of the DCI format 1B or the DCI format 1D of the 3GPP TS 36.212.

A length of the resource allocation indicator, that is, a size of bit allocated to the resource allocation indicator, may vary based on a value of the resource allocation type and the downlink system bandwidth.

In operation 1420, the base station may transmit, to the terminal, the resource allocation scheme identifier and the resource allocation indicator. In an aspect of the present invention, the base station may transmit the resource allocation scheme identifier and the resource allocation indicator through the higher layer signaling, for example, RRC layer signaling.

The terminal may determine a radio resource which has a possibility of being used for transmission of a PDCCH, based on the resource allocation scheme identifier and the resource allocation indicator. The terminal may decode the PDCCH by performing blind-decoding of the radio resource which has a possibility of being used for the transmission of the PDCCH. When the decoding succeeds, the terminal may determine that the PDCCH is transmitted.

The terminal may not search a whole downlink of radio resources and instead may search radio resources in a predetermined area based on the resource allocation scheme identifier and the resource allocation indicator and thus, the terminal may not perform unnecessary operations. Accordingly, power consumption of the terminal may be reduced and a lifespan of a battery may increase.

Figure 15:
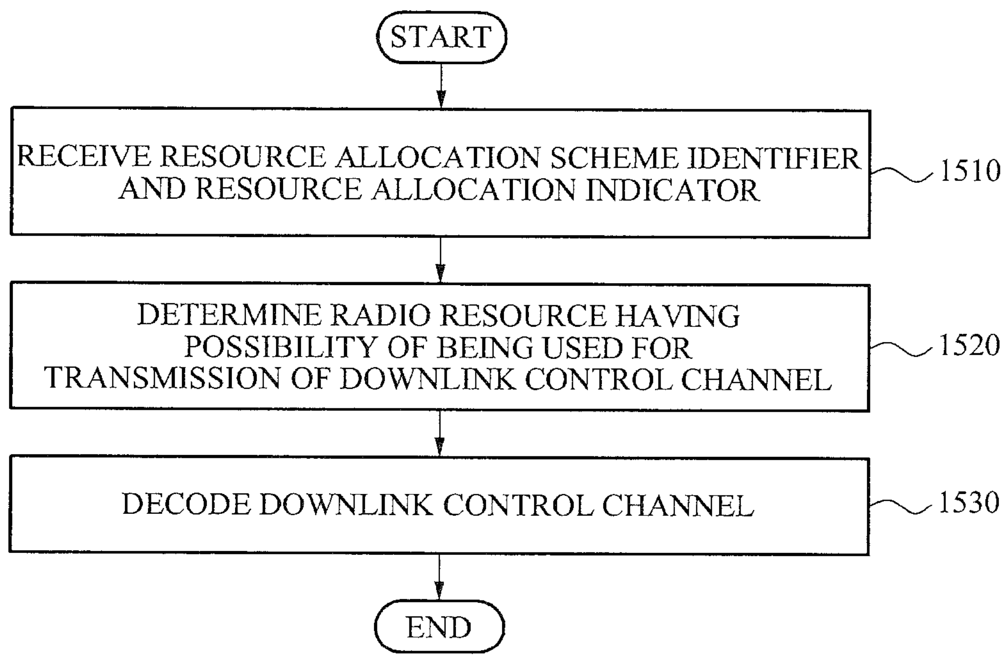
FIG. 15 is a flowchart illustrating a method for operation of a terminal according to another embodiment.

FIG. 15 illustrates a method for operation of a terminal according to another embodiment.

In operation 1510, the terminal may receive, from a base station, a resource allocation indicator generated based on a resource allocation scheme identifier. The method of generating the resource allocation indicator based on the resource allocation scheme identifier has been described with reference to FIG. 14 and thus, detailed descriptions thereof will be omitted for conciseness.

In an aspect of the present invention, the terminal may receive the resource allocation indicator, through higher layer signaling, for example, RRC signaling.

In operation 1520, the terminal may determine, based on the resource allocation indicator, a radio resource which has a possibility of being used for transmission of a PDCCH transmitted from the base station.

In operation 1530, the terminal may perform blind-decoding of the radio resource which has a possibility of being used for the transmission of the PDCCH. When the decoding succeeds, the terminal may determine that the PDCCH is transmitted.

The terminal may not search the whole downlink of radio resources, and instead may search radio resources in a predetermined area based on the resource allocation scheme identifier and the resource allocation indicator and thus, the terminal may not perform unnecessary operations. Accordingly, power consumption of the terminal may decrease and a lifespan of a battery may increase.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of transmitting control information, the method comprising:

configuring a resource allocation scheme identifier indicating a resource allocation type;

configuring a resource allocation indicator indicating allocation information on resource for transmission of a downlink control channel according to the resource allocation type indicated by the resource allocation scheme identifier; and transmitting to a receiver the resource allocation scheme identifier and the resource allocation indicator by upper layer signaling, wherein the resource allocation scheme identifier distinguishes 4 or more types including resource allocation type 0, resource allocation type 1, resource allocation type 2 with localized virtual resource blocks, and resource allocation type 2 with distributed virtual resource blocks, and wherein the resource allocation scheme identifier and the resource allocation indicator are included in RRC (Radio Resource Control) signaling message transmitted from the base station.

2. The method of claim 1, wherein a size of the resource allocation indicator is varied according to the resource allocation type.

3. A method of receiving control information, the method comprising:

receiving a resource allocation scheme identifier indicating a resource allocation type and a resource allocation indicator indicating allocation information on resource for transmission of a downlink control channel according to the resource allocation type indicated by the resource allocation scheme identifier; and decoding the downlink control channel in the resource for transmission of downlink control channel based on the resource allocation scheme identifier and the resource allocation indicator, wherein the resource allocation scheme identifier distinguishes 4 or more types including resource allocation type 0, resource allocation type 1, resource allocation type 2 with localized virtual resource blocks, and resource allocation type 2 with distributed virtual resource blocks, and wherein the resource allocation scheme identifier and the resource allocation indicator are included in RRC (Radio Resource Control) signaling message transmitted from the base station.

4. The method of claim 1, wherein a size of the resource allocation indicator is varied according to system bandwidth.

5. The method of claim 3, wherein a size of the resource allocation indicator is varied according to the resource allocation type and system bandwidth.

* * * * *